United States Patent
Khoury

(10) Patent No.: US 8,944,447 B2
(45) Date of Patent: Feb. 3, 2015

(54) AXLE ADJUSTMENT FOR AXLES OF UTILITY VEHICLES

(71) Applicant: SAF-Holland, GmbH, Bessenbach (DE)

(72) Inventor: Jean Khoury, Dreieich (DE)

(73) Assignee: SAF_Holland GmbH, Bessenbach (DE)

( * ) Notice: Subject to any disclaimer, the term of this patent is extended or adjusted under 35 U.S.C. 154(b) by 0 days.

(21) Appl. No.: 14/345,358

(22) PCT Filed: Oct. 1, 2012

(86) PCT No.: PCT/EP2012/069309
§ 371 (c)(1),
(2) Date: Mar. 17, 2014

(87) PCT Pub. No.: WO2013/053610
PCT Pub. Date: Apr. 18, 2013

(65) Prior Publication Data
US 2014/0361504 A1    Dec. 11, 2014

(30) Foreign Application Priority Data
Oct. 10, 2011 (DE) .......................... 10 2011 084 198

(51) Int. Cl.
*B60B 35/10* (2006.01)
*B62D 17/00* (2006.01)
*B60G 17/00* (2006.01)

(52) U.S. Cl.
CPC ................ *B60G 17/00* (2013.01); *B62D 17/00* (2013.01)
USPC ....................................... 280/86.75; 301/128

(58) Field of Classification Search
USPC ............................ 280/86.75, 86.754; 301/128
See application file for complete search history.

(56) References Cited

U.S. PATENT DOCUMENTS

| 34,659 A | 3/1862 | Wright |
| 3,124,370 A * | 3/1964 | Traugott .................. 280/86.756 |
| 3,526,413 A * | 9/1970 | Muller ..................... 280/86.756 |
| 3,880,444 A | 4/1975 | Bridges |
| 4,149,607 A * | 4/1979 | Hopkins et al. ............ 248/354.4 |
| 4,267,896 A | 5/1981 | Hendriksen |
| 4,424,984 A * | 1/1984 | Shiratori et al. ......... 280/86.753 |
| 4,695,073 A * | 9/1987 | Pettibone et al. ........ 280/86.757 |
| 4,718,691 A * | 1/1988 | Specktor et al. ........... 280/86.75 |
| 4,869,527 A * | 9/1989 | Coddens .................. 280/86.753 |
| RE33,179 E * | 3/1990 | Pettibone ................. 280/86.753 |
| 5,052,711 A * | 10/1991 | Pirkey et al. ............. 280/86.753 |
| 5,163,699 A * | 11/1992 | Specktor ................. 280/86.753 |
| 6,176,501 B1 * | 1/2001 | Bartolone ................ 280/86.756 |

(Continued)

FOREIGN PATENT DOCUMENTS

| DE | 37 30 176 | 3/1989 |
| DE | 600 14 565 | 2/2005 |
| EP | 0306626 | 3/1989 |

*Primary Examiner* — Paul N Dickson
*Assistant Examiner* — Laura Freedman
(74) *Attorney, Agent, or Firm* — Price Heneveld LLP

(57) ABSTRACT

An axle adjustment for axles of utility vehicles includes a frame unit, an eccentric element, and an adjustment unit, wherein the eccentric element has a first contour engageable by a select one of the frame unit and the adjustment unit, and the eccentric element has a second contour engageable by the other of the frame unit and the adjustment unit, wherein the first contour is arranged eccentric to the second contour, and wherein the frame unit and the adjustment unit are secured in a predetermined position in an adjustment direction and supported pivotably relative to each other by setting a certain angle of twist of the eccentric element.

22 Claims, 4 Drawing Sheets

(56) References Cited

U.S. PATENT DOCUMENTS

| | | | |
|---|---|---|---|
| 6,409,189 B1 * | 6/2002 | Orimoto et al. | 280/86.751 |
| 6,688,616 B1 * | 2/2004 | Ziech | 280/86.751 |
| 7,111,854 B1 * | 9/2006 | Tuthill et al. | 280/86.75 |
| 7,296,809 B2 * | 11/2007 | Zebolsky | 280/86.75 |
| 7,416,342 B2 * | 8/2008 | Peters et al. | 384/222 |
| 8,371,596 B2 * | 2/2013 | Johnson et al. | 280/124.116 |
| 8,567,772 B2 * | 10/2013 | McCarthy et al. | 267/265 |
| 8,590,912 B2 * | 11/2013 | McCarthy et al. | 280/124.175 |
| 2003/0132593 A1 | 7/2003 | Ross et al. | |
| 2005/0156398 A1 | 7/2005 | Ramsey | |
| 2011/0068524 A1 | 3/2011 | McCarthy | |

* cited by examiner

AXLE ADJUSTMENT FOR AXLES OF UTILITY VEHICLES

BACKGROUND OF THE INVENTION

The present invention relates to an axle adjustment for preferably leaf-sprung axles of utility vehicles.

Axle adjustments for leaf-sprung axles of utility vehicles are known in the prior art. In particular, the track of an axle or the track of the wheels fixed to the axle is set or corrected by means of an axle adjustment means. The axle adjustment means known from the prior art uses in particular a spindle or a threaded rod, which is twisted or rotated relative to an engagement means and, thus, causes a shortening or lengthening of the adjustment element, which, in turn, causes a displacement at one end of the axle along the longitudinal axis of the utility vehicle. A problem is that the spindle is prone to dirt accumulation, corrosion or damage due to matter swirled up during travel and that it is time-consuming and labor-intensive to set the spindle, in particular due to a plurality of required assembly steps, and, thus, much outlay is required to ensure the operational reliability of the utility vehicle.

Therefore, the object underlying the present invention is to provide an axle adjustment means for axles of utility vehicles, which makes it particularly easily and safely possible to adjust the track for an axle of a utility vehicle in order to increase or ensure at any time in particular the operational reliability of the utility vehicle.

SUMMARY OF THE INVENTION

According to the invention, the axle adjustment comprises a frame unit, an eccentric element, and an adjustment unit, wherein the eccentric element has a first contour, by means of which one of the units, the frame unit or the adjustment unit, can be brought into engagement with the eccentric element, wherein the eccentric element has a second contour, by means of which the respective other unit (i.e. the adjustment unit or the frame unit) can be brought into engagement with the eccentric element, wherein the first contour is arranged eccentric to the second contour, and wherein by setting or adjusting a certain angle of twist or rotation of the eccentric element, the frame unit and the adjustment unit are secured in a predetermined position in or along an adjustment direction L and may be supported pivotably relative to each other. Preferably, the frame unit is a component firmly connected to the vehicle frame of the utility vehicle, such as a bearing block, which, inter alia, secures the adjustment unit against displacement along an adjustment direction, wherein according to the invention, this is done via an eccentric element. Preferably, the frame unit is made from sheet metal or cast material, which form a support structure and particularly preferably are fixed to one another in a bonded connection or substance-to-substance connection The adjustment direction is preferably that direction, in which the adjustment unit is displaced so as to preferably displace one end of an axle of the utility vehicle relative to the vehicle frame or to the chassis of the utility vehicle such that the track or the direction of movement or rolling of the wheels attached to the axle is correctly set. Particularly preferably, the adjustment unit is an elongate or preferably a cylindrical body having at its respective opposing ends two application points for introducing a force into the adjustment unit. The application points at the ends of the adjustment unit are preferably designed as bearing eyes and accommodate cylindrical pin elements, for example. Preferably, one end of the adjustment unit is indirectly or directly connected to the rigid axle and when the correct position of the adjustment unit along the adjustment direction in relation to the vehicle frame is set or aligned, also the axle is simultaneously held in the correct position. In particular the use of a rigid adjustment unit, without elements movable relative to each other, such as a thread, makes the axle adjustment particularly sturdy and suitable for the use in the chassis of utility vehicles, which are subject to high stresses due to swirled-up matter and corrosion-enhancing conditions. According to the invention, the eccentric element is in engagement with the adjustment unit and the frame unit and serves in particular to set the correct position of the adjustment unit relative to the frame unit. To this end, the eccentric element has a first contour and a second contour, wherein the first contour is arranged eccentrically relative to the second contour and wherein one of the units, either the frame unit or adjustment unit, is in engagement with the first contour and the respective other unit is in engagement with the second contour. When the eccentric element is turned about an axis of rotation, which is preferably transverse to the adjustment direction, the first contour moves relative to the second contour along the adjustment direction. Accordingly, the respective unit in engagement with the first contour also moves relative to the unit in engagement with the second contour. At the same time, according to the invention, the frame unit and the adjustment unit remain pivotable relative to one another although their relative positions along the adjustment direction are fixed. With regard to use in the utility vehicle, this pivotable arrangement is essential since, in particular in the case of a spring-loaded support of the axle, the position of the axle relative to the position of the frame unit changes also in the vertical direction, i.e. transverse to the adjustment direction. Therefore, it is necessary that the end of the adjustment unit fixed to the axle may follow said displacement, while the second end, which is fixed to the eccentric element, keeps its position relative to the vehicle frame, which accordingly results in a pivoting or swiveling movement. The eccentric element may be fixed via a first fastening means at least in a friction-locked or force-fitting manner at the frame unit or at the adjustment unit. Particularly preferably, the first fastening means is provided in order to secure the eccentric element against rotation relative to one of the two units, frame unit or adjustment unit. By impeding or preventing the rotation of the eccentric element, preferably also the position of the first contour of the eccentric element relative to the unit, at which the eccentric element is fixed by means of the first fastening means, may be kept, and the adjustment unit is thus fixed in a position along the adjustment direction relative to the frame unit. Particularly preferably, a suitable first fastening means is a pin, a screw/bolt, a threaded rod, or a nut fixed to a thread.

Preferably, the first contour or the second contour is formed essentially circular, wherein the respective other contour is formed regularly polygonal or essentially circular. To put it differently, it is thus preferred that at least one of the two contours, the first or the second contour, is formed circular, wherein the respective other contour may be formed either polygonal or essentially also circular. This feature is preferred in particular so that there is provided a pivotable support of the adjustment unit at the frame unit, wherein this requires an at least essentially circular contact area or a cylinder-shaped or cone-shaped contact area of the eccentric element with the respective unit, which is pivotable relative to the other unit. The essentially circular contour preferably may also comprise recesses, which deviate from the circular shape, wherein however in particular the contact areas follow a circular path with an element engaging the contour. Regularly polygonal means in the present case that as cross-sectional surface for one of the two contours there are provided in particular equilateral polygons, particularly preferably a rectangle, a hexagon, an octagon or a dodecagon. Particularly preferably, the polygonal contour has an inner circle, wherein the center of the inner circle of the polygonal contour is arranged eccentrically relative to the center of the respective other circle-shaped contour.

It is advantageous if the center of the first contour is spaced apart from the center of the second contour by an eccentricity, wherein the first contour has a mean radius $R_1$ and the second contour has a mean radius $R_2$, wherein the relationship of $(R_2-R_1-E)$ to $R_2$ is in an a range of 0.1 to 0.6, preferably 0.2 to 0.4, and particularly preferably it is 0.23. Particularly expediently, the first contour is arranged within the second contour, or the first contour has a smaller radius than the second contour. Particularly preferably, the second contour is the outer contour of the eccentric element and has a radius $R_2$. Furthermore, the first contour preferably is a cavity in the eccentric element and has a mean radius $R_1$. The difference of the radius $R_2$ as minuend and the sum of the radius $R_1$ and the eccentricity E as subtrahend preferably corresponds to the remaining wall thickness of the eccentric element at the thinnest point of the wall in the area of the first contour. Thus, the smaller the relationship of $(R_2-R_1-E)$ to $(R_2)$, the smaller the wall thickness of the eccentric element at the thinnest point, i.e. the point where a cavity has been formed in the eccentric. This may be of importance in particular in case the eccentric element has to transmit large forces along or transverse to said smallest wall thickness, and the material in this point is to be thick enough in order to avoid high stresses occurring in the material.

Preferably, the second contour of the eccentric element may be brought into direct engagement with the frame unit or with the adjustment unit. A preferred direct engagement is characterized in particular in that no additional, in particular loose components, are required in order to fix the eccentric element at the frame unit or at the adjustment unit positively or in a form-fitting manner. Thus, the use of an eccentric element helps to substantially reduce the assembly work for fixing the adjustment unit in a certain position relative to the frame unit.

Further preferably, the eccentric element is positively secured via second fastening means, at least against displacement in the adjustment direction relative to the frame unit or to the adjustment unit. The second fastening means are particularly preferably projections, which comprise abutment surfaces directed transverse to the adjustment direction or essentially transverse to the adjustment direction, against which the eccentric element rests and is secured against displacement along the adjustment direction. In a particularly preferred embodiment, the second fastening means are provided at the frame unit and prevent that the eccentric element displaces in the adjustment direction relative to the frame unit, wherein the eccentric element remains at the same time at first rotatable relative to the frame unit. Particularly preferably, the second fastening means are formed as projections or jaws, which may be fixed at the respective unit, i.e. the frame unit or the adjustment unit, either in a substance-to-substance bond or positively or frictionally.

Particularly preferably, the adjustment unit comprises an engagement portion, which at least over a certain area may be brought into positive or form-fitting engagement with the first contour of the eccentric element or with the first fastening means. Particularly preferably, the engagement portion is formed cylindrical or essentially rotation-symmetric, i.e. for example cone-shaped or conical. This ensures that the engagement portion of the adjustment unit remains rotatable or pivotable relative to the eccentric element, wherein particularly preferably also the first contour of the eccentric element is formed circular. In an alternative embodiment, the engagement portion of the adjustment unit may be designed to come into positive engagement with the second contour of the eccentric element, wherein in this design configuration the first contour of the eccentric element may be brought into positive engagement with the respective fastening means or directly with the frame unit.

Further preferably, the frame unit comprises a guiding portion, which at least over a certain area is positively engaged by the first contour of the eccentric element or the engagement portion of the adjustment unit or the first fastening means so as to secure the engagement portion of the adjustment unit against displacement transverse to the adjustment direction relative to the frame element. Particularly preferably, the guiding portion of the frame unit is an elongate hole, i.e. a longish cavity in the frame unit, which extends essentially along the adjustment direction. Particularly preferably, the two long flanks or lateral surfaces of the guiding portion are spaced apart from one another by at least the distance of two times the radius of the respective contour engaging the guiding portion. Alternatively, the guiding portion of the frame unit may also be formed as an elongate projection, which is positively engaged by a corresponding groove or a corresponding recess so as to guide the part corresponding to the frame unit along the adjustment direction. The extension of the guiding portion along the adjustment direction is at least as large as the eccentricity of the first contour from the second contour of the eccentric element.

Further preferably, the engagement portion of the adjustment unit is formed as a cavity, wherein the first contour of the eccentric element is formed as a projection and at least over a certain area positively engages the engagement portion. In this preferred embodiment, the engagement portion of the adjustment unit is formed preferably as a recess or bore or cavity, wherein particularly preferably a bearing eye may be provided at the engagement portion. At least over a certain area, the first contour of the eccentric element positively engages the cavity of the engagement portion, wherein it is in particular preferred that both the engagement portion and the first contour are formed circular or cylinder-shaped.

In a further preferred embodiment, the first fastening element at least over a certain area may be brought into positive engagement with the guiding portion of the frame unit and the first contour of the eccentric element and the engagement portion of the adjustment unit. This preferred embodiment may be the first fastening element, such as a pin or a screw/bolt, which is guided through the areas preferably formed as recess or cavity, i.e. guiding portion of the frame unit, first contour and engagement portion of the adjustment unit, and fix the same to one another both positively and, insofar as there is provided a screw/bolt, also frictionally. In order to ensure that the adjustment unit is supported pivotably relative to the frame unit, it is preferred that there are provided washers or rubber supports at the respective points, which may move relative to one another and thus make it possible that a pivotable support continues to be ensured despite the fact that the frame unit is positively and frictionally fixed to the eccentric element and the adjustment unit.

Particularly preferably, the first contour and the second contour of the eccentric element are formed circular, so as to fix the eccentric element at the frame unit at any desired angle of twist or rotation in order to make it possible to stagelessly or continuously set the position of the adjustment unit relative to the frame unit along the adjustment direction L. Particularly preferably, the translational path x of the adjustment unit relative to the frame unit is a function of the cosine of the angle of twist α and the eccentricity of the centers of the first contour and the second contour (formula: x=±cos α·E). In the case of a circular outer contour or second contour of the eccentric element, it is possible to stagelessly set the angle of the eccentric element relative to the frame unit, wherein there is ensured that the translational position of the adjustment unit relative to the frame unit is also stagelessly set. However, in this configuration variant, it has to be taken care that in particular in the case of a highly eccentric design of the first contour relative to the second contour, high moments or torques occur, which may displace the eccentric element relative to the frame unit and measures have to be taken in order to hold the eccentric element in the preferred position. Particularly preferably, the eccentric element may be fixed in the desired position or be fixed by a substance-to-substance bond by means of a welding spot or a plurality of welding spots.

In an alternatively preferred embodiment, the second contour of the eccentric element is formed regularly polygonal, wherein the second fastening means secure the eccentric element against rotation relative to the frame unit, and wherein the number of corners of the polygonal second contour determines the number of possible angles of twist of the eccentric element, and accordingly there may be set half as many translational positions in the adjustment direction as angles of twist. Alternatively to the circle-shaped contour of the eccentric element, the latter may preferably also be formed polygonal. Here, an even number of corners of the respective polygon is particularly preferred since this ensures that there are two respective opposite parallel sides, which in turn are suitable to come into engagement with the second engagement means and accordingly are secured both against displacement along the adjustment direction and against rotation or twisting. Preferably, while the eccentric element is in the position, in which the form fit is provided by the second fastening means, it may not be turned or twisted, wherein there is provided a high safety against rotation of the eccentric element when there are great forces. In order to simplify the assembly or the correct setting of the eccentric element in the mounted state, it may be preferred to design the second fastening means as separate components, which may be removed from the frame element during the setting process of the correct angle of twist of the eccentric element and be fixed to the frame unit after the setting process has been completed, and come into positive engagement with the second contour of the eccentric element. It may be alternatively preferred that the first contour of the eccentric element is formed regularly polygonal, wherein accordingly the second contour is formed circular and wherein it has to be taken care that the respective geometry of the first fastening element corresponding to the first contour, or the engagement portion of the adjustment unit corresponds to the polygonal configuration.

Further advantages and features result from the following description of preferred embodiments of the axle adjustment according to the invention with reference to the appended Figures. As a matter of course, individual features of the various embodiments shown may be combined with each other within the framework of the present invention.

DETAILED DESCRIPTION OF THE PREFERRED EMBODIMENTS

Figure 1:
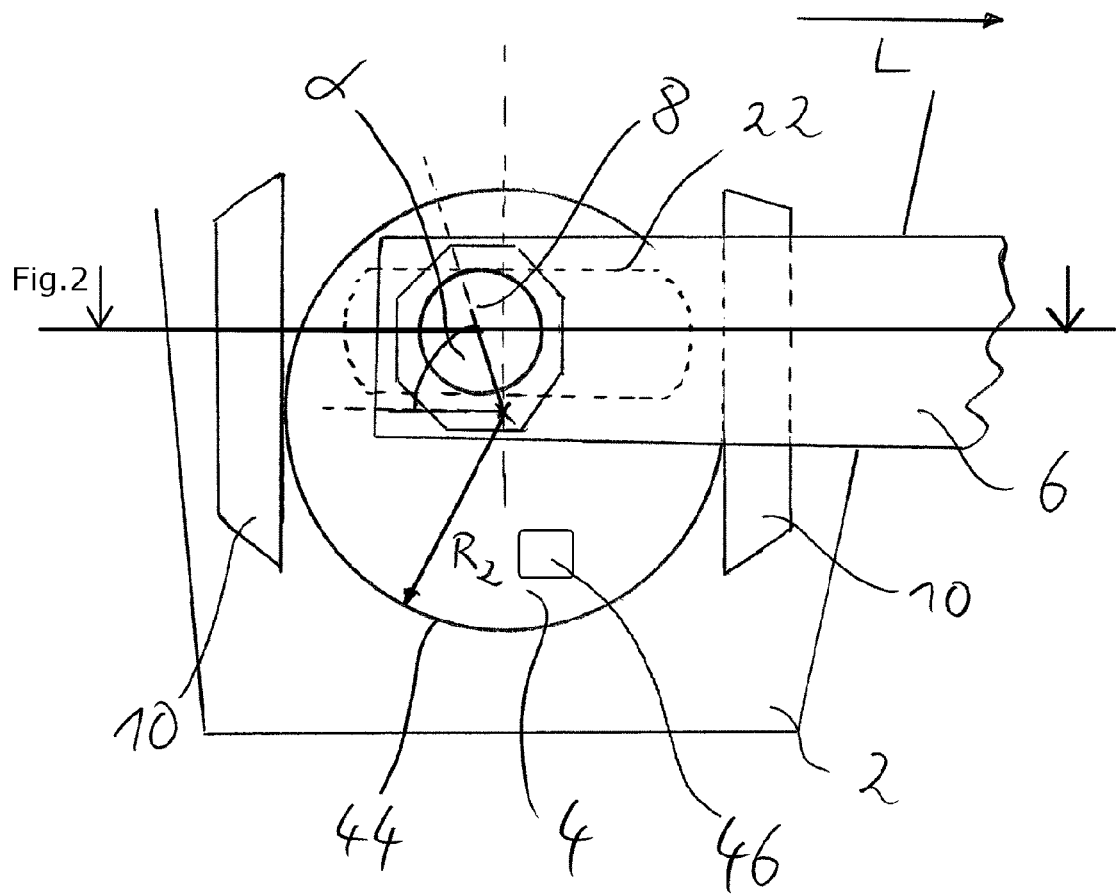
FIG. 1 shows a view of a preferred embodiment of the axle adjustment according to the invention.

FIG. 1 shows a side view of a preferred embodiment of the axle adjustment according to the invention. According to the invention, there are provided a frame unit 2, an eccentric element 4 and an adjustment unit 6, wherein the adjustment unit is connected to the frame unit 2 by means of a first fastening means 8 and the eccentric element 4. The eccentric element 4 has a second contour 44, which is formed circular, wherein the circular second contour 44 has a radius $R_2$. The eccentric element 4 further has a first contour 42, which is also formed circular or preferably also formed circular, and whose center is spaced apart from the center of the second contour. To put it differently, the first contour 42 is arranged eccentrically relative to the second contour 44 of the eccentric element. Against displacement in the adjustment direction L, the eccentric element 4 rests against two respective opposite second fastening means 10, which by means of a positive engagement prevent that the eccentric element 4 displaces in the adjustment direction L. When the eccentric element 4 is rotated by an angle of twist α, the first contour 42 is displaced in the adjustment direction L since the eccentric element 4 rests against the second fastening means 10 and, thus, is secured against displacement in the adjustment direction L. Preferably, the adjustment unit 6 is in direct or indirect engagement with the first contour 42, wherein when the first contour 42 is displaced in the adjustment direction L, also the adjustment unit 6 is displaced in the adjustment direction L. In an alternatively preferred embodiment, the adjustment unit 6 is fixed by means of a first fastening means 8, which particularly preferably provides for a frictional connection and a form fit or positive connection between the first contour 42 and a not-shown engagement portion 62 of the adjustment unit 6 and, thus, fixes the adjustment unit 6 at the first contour 42. Furthermore, a dashed line shows the guiding portion 22 of the frame unit 2, which serves in particular in order to prevent that the adjustment unit 6 displaces transverse to the adjustment direction L. Preferably, at the front side of the eccentric element 4, there is provided a handling aid 46, which is designed as a projection or as a hand crank, for example. The handling aid 46 makes it particularly easy for the user to rotate the eccentric element 4 relative to the frame unit.

Figure 2:
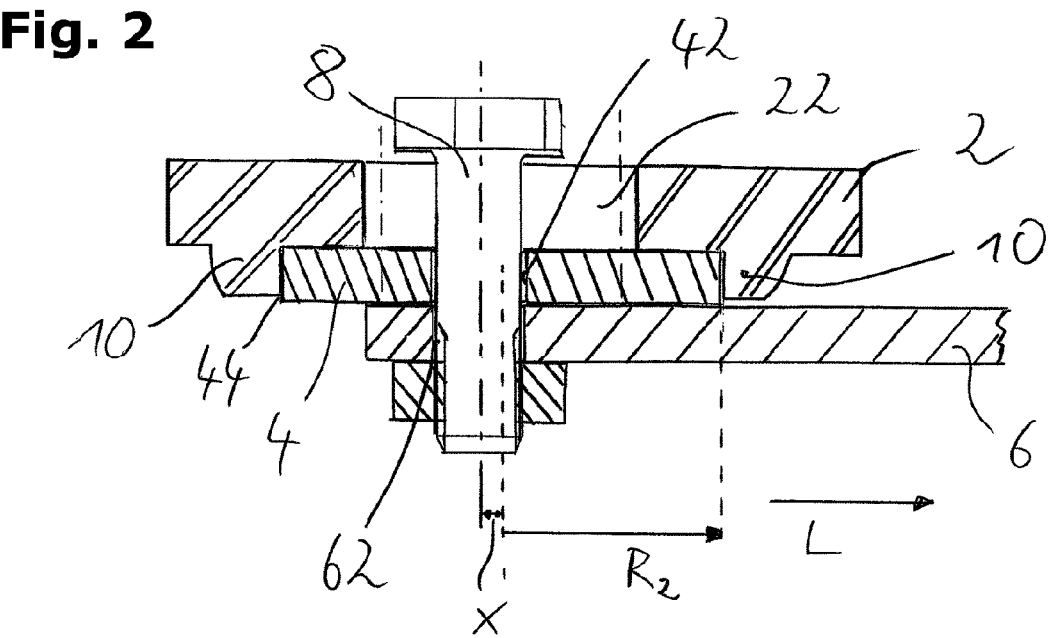
FIG. 2 shows a sectional view of the preferred embodiment of the axle adjustment according to the invention, which is shown in FIG. 1.

FIG. 2 shows the sectional view already indicated in FIG. 1 of the preferred embodiment shown in FIG. 1. It is in particular clearly shown that the first fastening means 8 passes both through the guiding portion 22 of the frame element 2 and through the first contour 42 of the eccentric element 4 and through the engagement portion 62 of the adjustment unit 6, and fixes said parts or units to one another positively or form-fittingly. In this preferred embodiment, thus the engagement portion 62 of the adjustment unit 6 and the first contour of the eccentric element 4 are formed as a cavity or bore, wherein particularly preferably there is provided a circular or cylindrical geometry, which in turn may be engaged by a cylindrical body, such as a pin or a screw/bolt. The dashed lines also show the position of the center of the first contour 42 relative to the position of the center of the second contour 44. This position or offset in the adjustment direction L is designated by the letter x. In addition, in this embodiment, the second fastening means 10 is formed as an integral part of the frame unit 2, wherein there are provided particularly preferably two opposite second fastening means 10, which secure the eccentric element 4 against displacement both in the positive and in the negative adjustment direction L. The first fastening means 8 is particularly preferably designed as a screw/bolt, wherein opposite of the screw head, i.e. at the top in the Figure, there is provided a nut, which provides a frictional connection between the elements or units through which the screw/bolt passes. Particularly preferably, washers, which are not shown in the Figure, are used, in order to allow for a pivotability of the adjustment unit 6 relative to the frame unit 2, even then there is a frictional connection, wherein during this process the washers slide against or relative to each other.

Figure 3:
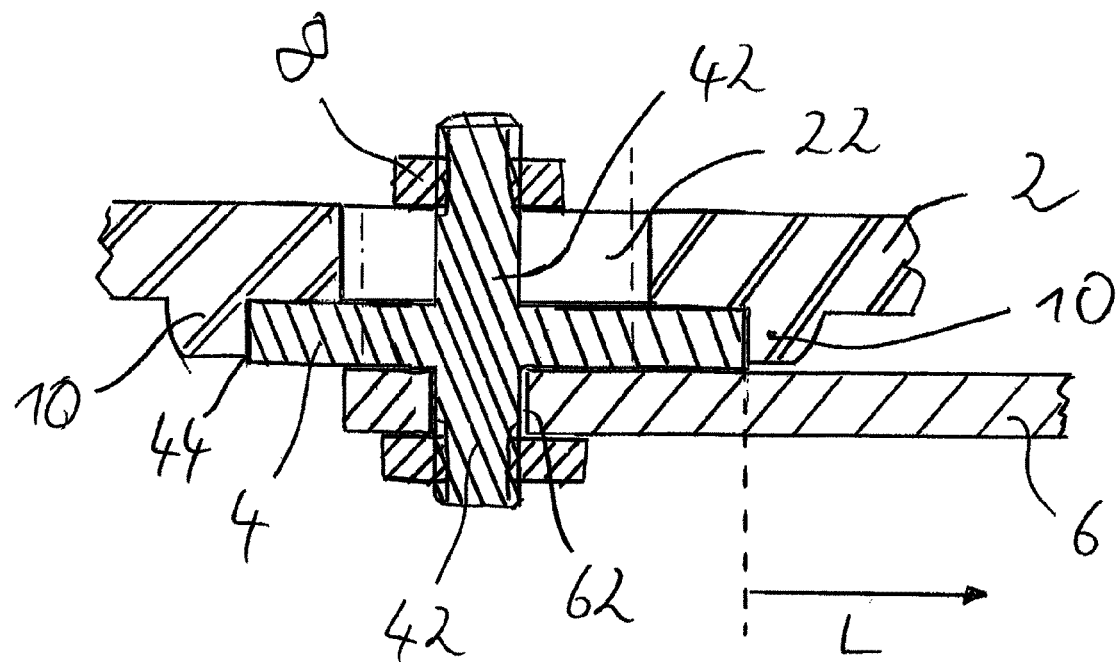
FIG. 3 shows a sectional view of an alternative embodiment of the axle adjustment according to the invention.

FIG. 3 shows a further sectional view of a preferred embodiment of the axle adjustment according to the invention, wherein particularly preferably the first contour 42 is formed as a projection, particularly preferably as a pin-shaped or cylindrical projection, which projects from the eccentric element in two directions transverse to the adjustment direction L. Here, that part of the first contour 42, which projects downwards, positively engages the engagement portion 62 of the adjustment unit 6, which is formed as a recess or cavity, and is positively and frictionally fixed at the end projecting from the engagement portion by a nut. Furthermore, the upwards projecting part of the first contour 42 positively engages the guiding portion 22 of the frame unit 2 and secures the eccentric element 4 against displacement transverse to the adjustment direction L. In the present case, the first fastening means 8 is formed particularly preferably as a nut, which positively and frictionally engages a thread provided to this end at the eccentric element 4 or at the first contour 42.

Figure 4:
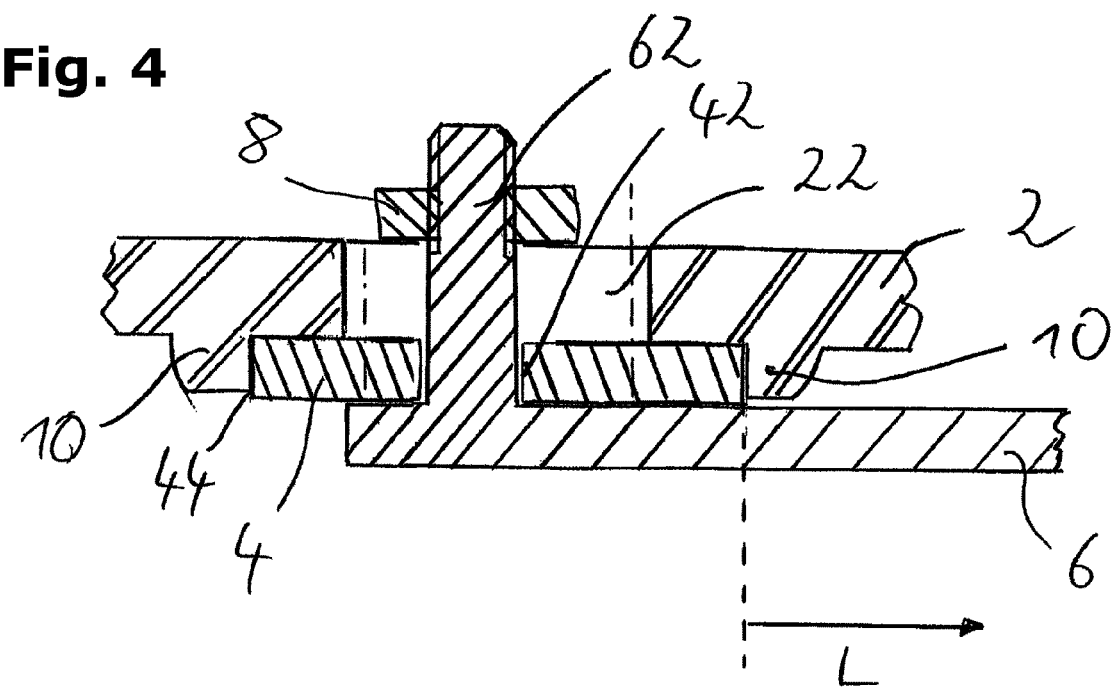
FIG. 4 shows a sectional view of a further preferred embodiment of the axle adjustment according to the invention.

FIG. 4 shows a further sectional view of a preferred embodiment of the axle adjustment according to the invention, wherein in this embodiment, the engagement portion 62 of the adjustment unit 6 is formed as a projection, which passes through the first contour 42, which is designed as a cavity, and through the guiding portion 22 of the frame unit 2, and at its distal end, which is at the top in the Figure, is held in a positive and frictional engagement by the first fastening means 8. Particularly preferably, the first fastening means 8 relative to the frame unit 2 rests against one or a plurality of washers (not shown in the Figure) in order to be able to carry out a rotating movement or pivoting movement of the adjustment unit 6 and, thus, also of the engagement portion 62 of the adjustment unit 6 relative to the frame unit 2 without releasing the first fastening means 8 from the engagement portion 62.

Figure 5:
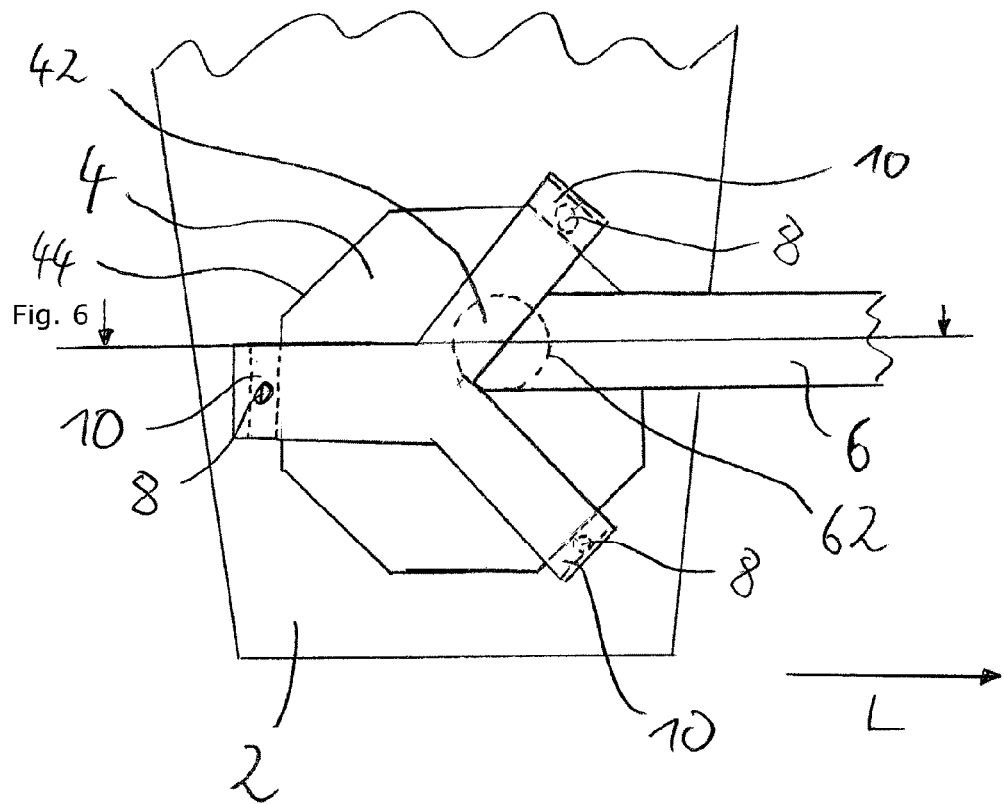
FIG. 5 shows a view of a preferred embodiment of the axle adjustment according to the invention.

FIG. 5 shows a view of a further embodiment of the axle adjustment according to the invention, wherein particularly preferably the eccentric element 4 has a second contour 44, which is formed as a uniform or regular polygon. Displaced relative to the center of the inner circle of the second contour 44, there is provided the first contour 42, wherein said contour is preferably formed circular and is in positive engagement with the engagement portion 62 of the adjustment unit 6. Furthermore, there are preferably provided two or, as is shown in the Figure, three second fastening means 10, which positively secure the eccentric element 4 against displacement along the adjustment direction L. In the preferred embodiment shown here, the second fastening means 10 secure the eccentric element 4 also against displacement transverse to the adjustment direction L, since the second fastening means 10, which are shown on the right-hand side in the Figure, may also transmit holding forces to the eccentric element 4 transverse to the adjustment direction L. In this preferred embodiment, it is also possible to arrange the eccentric element 4 in defined or discrete angle positions or angles of twist α relative to the frame unit 2 or relative to the second fastening means 10, wherein the number of the available arrangement positions of the eccentric element 4 depends on the number of corners thereof. In the present case, the eccentric element 4 may thus be arranged at the frame unit 2 in eight positions of angle of twist. The second fastening means 10 positively engage the frame unit 2 and are thus secured against displacement along and transverse to the adjustment direction L, wherein the first fastening means 8 are designed such that they hold the second fastening means 10 in the positive or form-fitting position relative to the frame unit 2. Preferably, the two second fastening means 10, which are shown on the right in the Figure, are spaced apart transverse to the adjustment direction L such that the adjustment unit 6 does not abut the second fastening means 10 when the adjustment unit 6 is maximally hinged, i.e. in the maximum upper or bottom position or when the angle of twist α is plus or minus 90 degrees.

Figure 6:
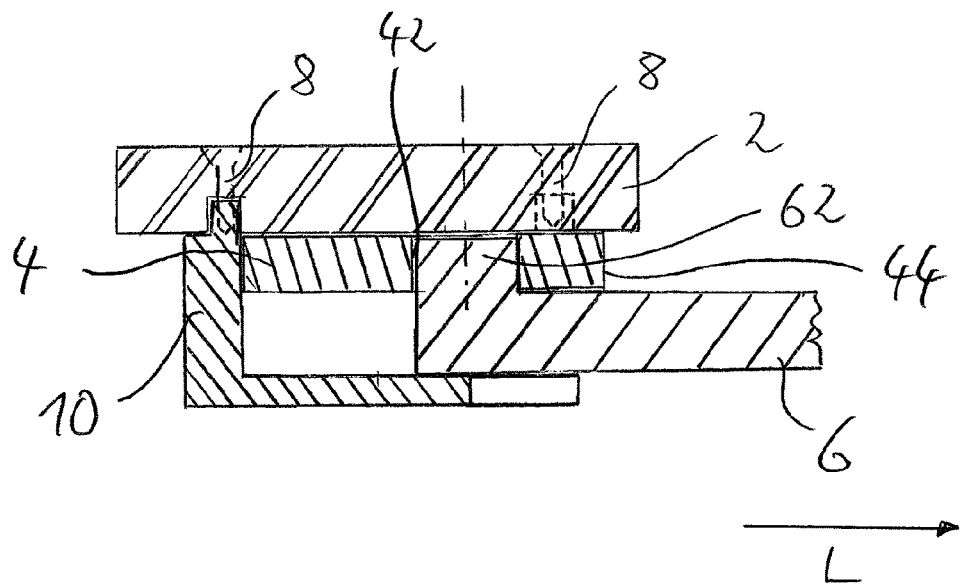
FIG. 6 shows a sectional view of the preferred embodiment of the axle adjustment according to the invention, which is shown in FIG. 5.

FIG. 6 shows a sectional view of the preferred embodiment already shown in FIG. 5, wherein it can be seen that the second fastening means 10 are connected to one another by means of a bridge or web, shown at the bottom in the Figure, and are in positive engagement with the frame unit 2, wherein the fastening means 8 are arranged such that they pass through the frame unit 2 and positively or frictionally engage the second fastening means 10, so as to hold them in that position, in which there is ensured a form fit with the frame unit 2. It is further shown that the engagement portion 62 of the adjustment unit 6 positively engages the first contour 42, which is formed as a cavity, wherein the first contour 42 and the engagement portion 62 are particularly preferably formed cylindrical. A further advantage of this preferred embodiment is that the bridge, which connects the second fastening means 10 to one another also prevents that the adjustment unit 6 displaces transverse to the adjustment direction L. In particular, the adjustment unit 6 is thus held in that position, in which the positive engagement with the first contour 42 is provided. It is further advantageous if the second fastening means 10 project from the frame unit 2 such that both the eccentric element 4 and the adjustment unit 6 may be arranged between the bridge connecting the second fastening means 10 and the frame unit 2.

Figure 7:
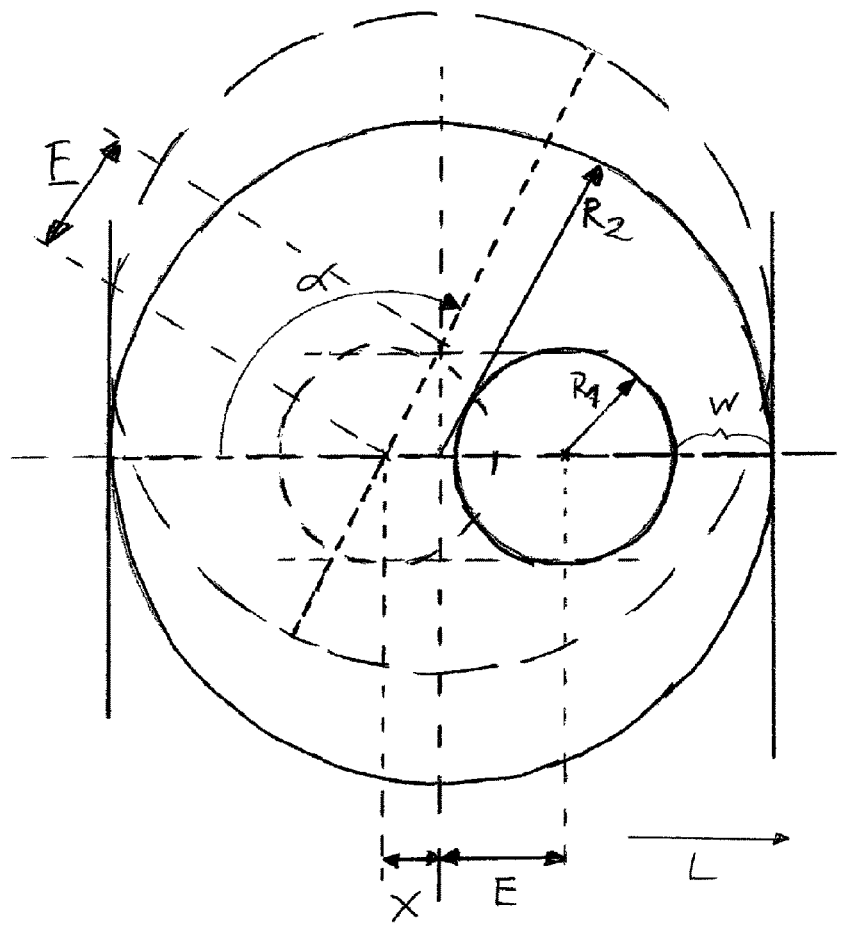
FIG. 7 shows a schematic diagram of the geometric conditions at the eccentric element.

FIG. 7 shows a geometric view or a schematic diagram of the eccentric displacement of the first contour 42 when the eccentric element 4 is rotated about an angle of twist α. Preferably, both the first contour 42 and the second contour 44 are formed circular, wherein the centers of the two contours are spaced apart by an eccentricity E, wherein the position of the center of the first contour 42 in the adjustment direction relative to the center of the second contour 44 is a function of the angle of twist and of the eccentricity E. If the angle of twist α=0°, the translational path x of the center of the first contour 42 along the adjustment direction L equals the eccentricity E. If the angle of twist α is not 0°, the translational path x of the center of the displaced first contour 42' along the adjustment direction L is a function of the eccentricity E and of the angle α. There is further shown that in case the center of the first contour 42 is guided on a line running horizontally or parallel to the adjustment direction L, as this is ensured by the guiding portion 22, for example, the eccentric element 4 has to displace in the case of a rotation transverse to the adjustment direction L. This results in a vertical offset of the displaced second contour 44' compared to the not displaced second contour 44. At the right-hand side of the Figure, there is shown the wall thickness w, which is a function of the radius $R_1$ of the first contour 42, of the radius $R_2$ of the second contour 44 and of the eccentricity.

Figure 8:
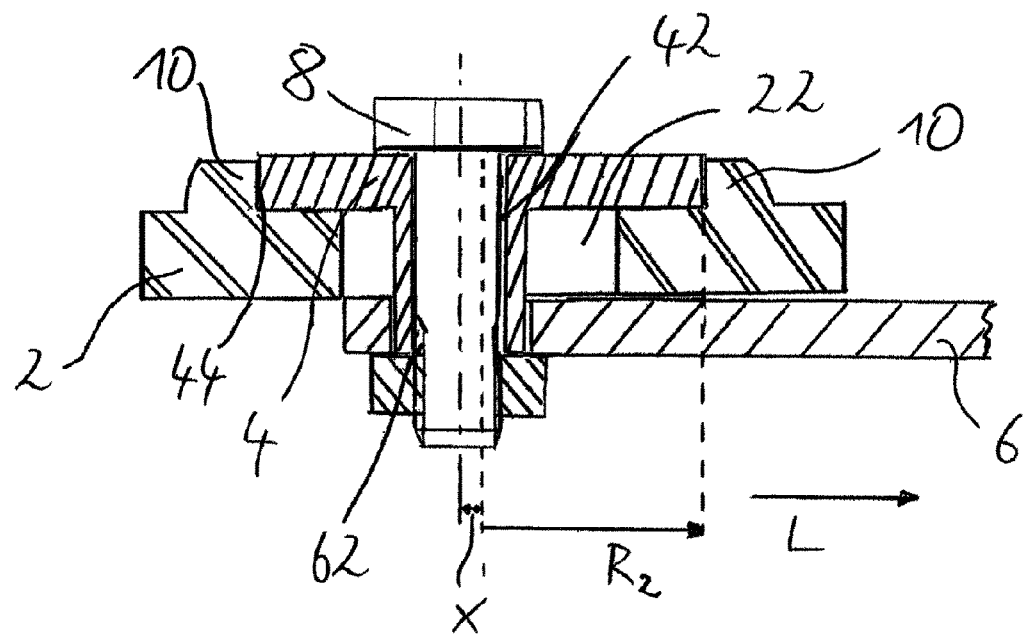
FIG. 8 shows a sectional view of a preferred embodiment of the axle adjustment according to the invention.

FIG. 8 shows a sectional view of a further preferred embodiment of the axle adjustment according to the invention, wherein the eccentric element 4 has a first contour 42, which preferably is formed tube- or sleeve-shaped. The first contour 42 preferably engages with its outer lateral surface the engagement portion 62 of the adjustment unit 6, which engagement portion is designed as a cavity. Further preferably, the second fastening means 10 are provided on that side of the frame unit 2, which is opposite the adjustment unit 6. It is possible to insert into the second contour 42, which preferably is formed sleeve-shaped, the first fastening means 8, which advantageously is designed as a screw/bolt, and it may be fixed by a nut provided at the bottom end of the first contour 42.

LIST OF REFERENCE SIGNS

2—frame unit
4—eccentric element
6—adjustment unit
8—first fastening means
10—second fastening means
22—guiding portion
42—first contour
42'—displaced first contour
44—second contour
44'—displaced second contour
46—handling aid
62—engagement portion
L—adjustment direction
α—angle of twist
$R_1$—radius inner contour
$R_2$—radius outer contour
E—eccentricity
w—wall thickness
x—position in adjustment direction

The invention claimed is:

1. Axle adjustment for axles of utility vehicles, comprising:
a frame unit;
an eccentric element; and
an adjustment unit;
wherein the eccentric element has a first contour engaged by a select one of the frame unit and the adjustment unit;
wherein the eccentric element has a second contour engaged by the other of the frame unit and the adjustment unit;
wherein the first contour is arranged eccentric to the second contour;
wherein the eccentric element is adapted to be friction-locked to a select one of the frame unit and the adjustment unit by a first fastening structure;
wherein the frame unit and the adjustment unit are secured in a predeterminable position along an adjustment direction and supported pivotably relative to each other by setting a certain angle of twist of the eccentric element;
wherein the center of the first contour is spaced apart from the center of the second contour by an eccentricity E; and
wherein the first contour has a mean radius $R_1$, and the second contour has a mean radius $R_2$, and wherein the relationship of $(R_2-R_1-E)$ to $(R_2)$ is in a range of about 0.1 to about 0.6.

2. The axle adjustment of claim 1, wherein at least one of the first contour and the second contour is formed substantially circular, and wherein the respective other contour is formed one of polygonal and substantially circular.

3. The axle adjustment of claim 2, wherein the relationship of $(R_2-R_1-E)$ to $(R_2)$ is in a range of 0.2 to 0.4.

4. The axle adjustment of claim 3, wherein the relationship of $(R_2-R_1-E)$ to $(R_2)$ is 0.23.

5. The axle adjustment for axles of claim 3, wherein the second contour of the eccentric element is in direct engagement with one of the frame unit and the adjustment unit.

6. The axle adjustment of claim 5, wherein the eccentric element is secured by a second fastening structure against displacement in the adjustment direction relative to at least one of the frame unit and the adjustment unit.

7. The axle adjustment of claim 6, wherein the adjustment unit has an engagement portion that at least over a certain area is adapted to positively engage one of the first contour of the eccentric element and the first fastening structure.

8. The axle adjustment of claim 7, wherein the frame unit has a guiding portion that is at least over a certain area positively engaged by one of the first contour of the eccentric element, the engagement portion of the adjustment unit, and the first fastening structure, so as to secure the engagement portion of the adjustment unit against displacement transverse to the adjustment direction relative to the frame unit.

9. The axle adjustment of claim 7, wherein the engagement portion of the adjustment unit comprises a cavity, and wherein the first contour of the eccentric element comprises a projection and positively engages the engagement portion at least over a certain area.

10. The axle adjustment of claim 6, wherein the first fastening structure positively engaging the guiding portion of the frame unit and the first contour of the eccentric element and the fastening portion of the adjustment unit at least over a certain area.

11. The axle adjustment of claim 10, wherein the first contour and the second contour of the eccentric element are circular so as to fix the eccentric element to the frame unit at any angle of twist so as to allow for a continuous setting of the position of the adjustment unit relative to the frame unit along the adjustment direction.

12. The axle adjustment of claim 10, wherein the second contour of the eccentric element is regularly polygonal, and wherein the second fastening structure secures the eccentric element against twisting relative to the frame unit.

13. The axle adjustment of claim 1, wherein the relationship of $(R_2-R_1-E)$ to $(R_2)$ is in a range of 0.2 to 0.4.

14. The axle adjustment of claim 13, wherein the relationship of $(R_2-R_1-E)$ to $(R_2)$ is 0.23.

15. The axle adjustment for axles of claim 1, wherein the second contour of the eccentric element is in direct engagement with one of the frame unit and the adjustment unit.

16. The axle adjustment of claim 1, wherein the eccentric element is secured by a second fastening structure against displacement in the adjustment direction relative to at least one of the frame unit and the adjustment unit.

17. The axle adjustment of claim 1, wherein the adjustment unit has an engagement portion that at least over a certain area is adapted to positively engage one of the first contour of the eccentric element and the first fastening structure.

18. The axle adjustment of claim 17, wherein the frame unit has a guiding portion that is at least over a certain area positively engaged by one of the first contour of the eccentric element, the engagement portion, of the adjustment unit, and the first fastening structure, so as to secure the engagement portion of the adjustment unit against displacement transverse to the adjustment direction relative to the frame unit.

19. The axle adjustment of claim 18, wherein the first fastening structure positively engaging the guiding portion of the frame unit and the first contour of the eccentric element and the engagement portion of the adjustment unit at least over a certain area.

20. The axle adjustment of claim 17, wherein the engagement portion of the adjustment unit comprises a cavity, and wherein the first contour of the eccentric element comprises a projection and positively engages the engagement portion at least over a certain area.

21. The axle adjustment of claim 1, wherein the first contour and the second contour of the eccentric element are circular so as to fix the eccentric element to the frame unit at any angle of twist so as to allow for a continuous setting of the position of the adjustment unit relative to the frame unit along the adjustment direction.

22. The axle adjustment of claim 1, wherein the second contour of the eccentric element is regularly polygonal, and wherein the second fastening structure secures the eccentric element against twisting relative to the frame unit.

* * * * *